United States Patent [19]
Shamshoum et al.

[11] Patent Number: 5,807,800
[45] Date of Patent: Sep. 15, 1998

[54] PROCESS FOR PRODUCING STEREOSPECIFIC POLYMERS

[75] Inventors: Edwar S. Shamshoum, Houston; Margarito Lopez, Pasadena, both of Tex.

[73] Assignee: Fina Technology, Inc., Dallas, Tex.

[21] Appl. No.: 798,245

[22] Filed: Feb. 11, 1997

[51] Int. Cl.$^6$ .................................................. C08F 4/64
[52] U.S. Cl. ........................... 502/104; 502/87; 502/117; 502/152; 502/155; 526/160; 526/943
[58] Field of Search .............................. 502/87, 104, 117, 502/152, 155

[56] References Cited

U.S. PATENT DOCUMENTS

| | | | |
|---|---|---|---|
| 3,258,445 | 6/1966 | Natta et al. | 260/93.7 |
| 3,305,538 | 2/1967 | Natta et al. | 260/93.7 |
| 3,364,190 | 1/1968 | Emrick | 260/93.7 |
| 4,298,718 | 11/1981 | Mayr et al. | 526/125 |
| 4,544,717 | 10/1985 | Mayr et al. | 526/125 |
| 4,701,432 | 10/1987 | Welborn, Jr. | 502/113 |
| 4,794,096 | 12/1988 | Ewen | 502/117 |
| 4,808,561 | 2/1989 | Welborn, Jr. | 502/104 |
| 4,892,851 | 1/1990 | Ewen et al. | 502/104 |
| 4,975,403 | 12/1990 | Ewen | 502/113 |
| 5,036,034 | 7/1991 | Ewen | 502/117 |
| 5,225,500 | 7/1993 | Elder et al. | 526/127 |
| 5,242,876 | 9/1993 | Shamshoum et al. | 502/113 |
| 5,243,002 | 9/1993 | Razavi | 526/170 |
| 5,308,811 | 5/1994 | Suga et al. | 502/62 |
| 5,444,134 | 8/1995 | Matsumoto | 526/159 |

*Primary Examiner*—David W. Wu
*Attorney, Agent, or Firm*—Jimmy D. Wheelington; William D. Jackson; M. Norwood Cheairs

[57] ABSTRACT

Stereospecific catalysts and processes for the stereotactic polymerization of ethylenically unsaturated monomers, specifically $C_3$–$C_4$ alpha olefins involving a molecular sieve supported metallocene catalyst comprising a stereospecific metallocene catalyst component and a co-catalyst component. The metallocene catalyst component incorporates a metallocene ligand structure having two sterically dissimilar cyclopentadienyl ring structures coordinated with the central transition metal atom. Both the metallocene catalyst component and the co-catalyst component are supported on a molecular sieve having an average effective pore size which is less than the kinetic diameter of at least one of said ring structures. This supported catalyst is contacted in a polymerization reaction zone with an ethylenically unsaturated monomer which contains 3 or more carbon atoms or which is a substituted vinyl compound under polymerization conditions to produce stereospecific polymerization of the monomer. The supported catalyst incorporates a molecular sieve support having an average effective pore size within the range of 5–10 angstroms. The metallocene component can be an unbalanced metallocene having a ligand structure in which stereorigidity is imparted by means of a structural bridge extending between dissimilar cyclopentadienyl groups, for example, a fluorenyl group, a cyclopentadienyl group, of a ligand which exhibits bilateral symmetry. The specific zeolite supports are zeolite Y, zeolite X, mordenite, and zeolite β. Others include various zeolites of the ZSM substitutional series, including ZSM-5, ZSM-11, and ZSM-12.

20 Claims, No Drawings

PROCESS FOR PRODUCING STEREOSPECIFIC POLYMERS

FIELD OF THE INVENTION

This invention relates to supported stereorigid metallocene catalysts useful in the production of stereospecific polymers from ethylenically unsaturated compounds and, more particularly, to such catalysts incorporating molecular sieve supports and their use.

BACKGROUND OF THE INVENTION

Syndiotacticity and isotacticity are stereospecific structural relationships which may be involved in the formation of stereoregular polymers from various monomers. Stereospecific propagation may be applied in the polymerization of ethylenically unsaturated monomers such as $C_3+$ alpha olefins, 1-dienes such as 1,3-butadiene, substituted vinyl compounds such as vinyl aromatics, e.g., styrene or vinyl chloride, vinyl chloride, vinyl ethers such as alkyl vinyl ethers, e.g., isobutyl vinyl ether, or even aryl vinyl ethers. Stereospecific polymer propagation is probably of most significance in the production of polypropylene of isotactic or syndiotactic structure.

Syndiotactic polymers have a unique stereochemical structure in which monomeric units having enantiomorphic configuration of the asymmetrical carbon atoms follow each other alternately and regularly in the main polymer chain. Syndiotactic polypropylene was first disclosed by Natta et al in the U.S. Pat. No. 3,258,445. As disclosed in this patent, syndiotactic polypropylene can be produced by using a catalyst prepared from titanium trichloride and diethylaluminum monochloride. U.S. Pat. No. 3,305,538 to Natta et al and U.S. Pat. No. 3,364,190 to Emrick disclose other catalyst systems.

As disclosed in the aforementioned patents, and as is known in the art, the structure and properties of syndiotactic polypropylene differ significantly from those of isotactic polypropylene. The isotactic structure is typically described as having the methyl groups attached to the tertiary carbon atoms of successive monomeric units on the same side of a hypothetical plane through the main chain of the polymer, e.g., the methyl groups are all above or below the plane. Using the Fischer projection formula, the stereochemical sequence of isotactic polypropylene is described as follows:

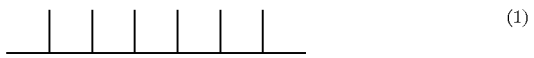

(1)

Another way of describing the structure is through the use of NMR. Bovey's NMR nomenclature for an isotactic pentad is ... mmmm ... with each "m" representing a "meso" dyad, or successive methyl groups on the same said of the plane of the polymer chain. As is known in the art, any deviation or inversion in the structure of the chain lowers the degree of isotacticity and crystallinity of the polymer.

In contrast to the isotactic structure, syndiotactic propylene polymers are those in which the methyl groups attached to the tertiary carbon atoms of successive monomeric units in the chain lie on alternate sides of the plane of the polymer. Syndiotactic polypropylene is shown in zig-zag representation as follows:

Corresponding representations for syndiotactic polyvinylchloride and polystyrene, respectively, are:

Using the Fisher projection formula, the structure of a syndiotactic polymer or polymer block for polypropylene is designated as:

Syndiotactic polymers are semi-crystalline and, like the isotactic polymers, are insoluble in xylene. This crystallinity distinguishes both syndiotactic and isotactic polymers from an atactic polymer, which is non-crystalline and highly soluble in xylene. An atactic polymer exhibits no regular order of repeating unit configurations in the polymer chain and forms essentially a waxy product.

Yet another polymer configuration which has both isotactic and atactic features is exemplified by hemi-isotactic polypropylene. Hemi-isotactic polypropylene is characterized by every other methyl group being on the same side of the polymer with the remaining methyl groups randomly being on the same side or on the opposite side of the polymer backbone. Hemi-isotactic polypropylene can be characterized by the following Fisher projection formula in which, as indicated by the broken lines, alternate methyl groups have random stearic configurations.

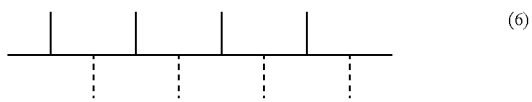

Hemi-isotactic polypropylene, while having a semi-ordered structure, is primarily non-crystalline because of the disorder of the alternate methene units.

In most cases, the preferred polymer configuration will be a dominantly isotactic or syndiotactic polymer with very little atactic polymer. Catalysts that produce isotactic polyolefins are disclosed in U.S. Pat. Nos. 4,794,096 and 4,975,403. These patents disclose chiral, stereorigid metallocene catalysts that polymerize olefins to form isotactic polymers and are especially useful in the polymerization of highly isotactic polypropylene. As disclosed, for example, in the aforementioned U.S. Pat. No. 4,794,096, stereorigidity in a metallocene ligand is imparted by means of a structural bridge extending between cyclopentadienyl groups. Specifically disclosed in this patent are stereoregular hafnium metallocenes which may be characterized by the following formula:

$R''(C_5(R')_4)_2HfQp$ (7)

In formula (7), $(C_5(R')_4)$ is a cyclopentadienyl or substituted cyclopentadienyl group, R' is independently hydrogen or a hydrocarbyl radical having 1–20 carbon atoms, and R" is a structural bridge extending between the cyclopentadienyl rings. Q is a halogen or a hydrocarbon radical, such as an alkyl, aryl, alkenyl, alkylaryl, or arylalkyl, having 1–20 carbon atoms and p is 2.

Catalysts that produce syndiotactic polypropylene or other syndiotactic polyolefins and methods for the preparation of such catalysts are disclosed in the aforementioned U.S. Pat. No. 4,892,851. These catalysts are also bridged stereorigid metallocene catalysts, but, in this case, the catalysts have a structural bridge extending between dissimilar cyclopentadienyl groups and may be characterized by the formula:

$$R"(CpR_n)(CpR'_m)MeQ_k \qquad (8)$$

In formula (8), Cp represents a cyclopentadienyl or substituted cyclopentadienyl ring, and R and R' represent hydrocarbyl radicals having 1–20 carbon atoms. R" is a structural bridge between the rings imparting stereorigidity to the catalyst. Me represents a transition metal, and Q a hydrocarbyl radical or halogen. $R'_m$ is selected so that $(CpR'_m)$ is a sterically different substituted cyclopentadienyl ring that $(CpR_n)$. In formula (8) n varies from 0–4 (0 designating no hydrocarbyl groups, i.e., an unsubstituted cyclopentadienyl ring), m varies from 1–4, and k is from 0–3. The sterically different cyclopentadienyl rings produce a predominantly syndiotactic polymer rather than an isotactic polymer.

Specifically disclosed in U.S. Pat. No. 4,892,851, are bridged metallocene ligands having a dissimilar cyclopentadienyl group resulting from the reaction of 6,6 dimethyl fulvene with a substituted cyclopentadiene, fluorene, to produce a ligand characterized by an isopropylidene bridge structure. Preferably, this ligand structure is characterized as having bilateral symmetry such as indicated by the isopropylidene(cyclopentadienyl fluorenyl) structure as shown below:

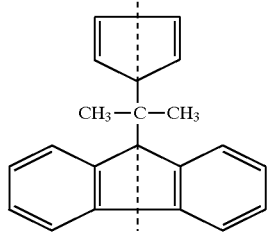

(9)

As indicated by formula (9), the bilateral symmetry of the ligand structure is indicated by the balanced orientation about the broken line representing a plane of symmetry extending generally through the bridge structure and the transition metal atom.

The foregoing structure may be contrasted with a metallocene which lacks bilateral symmetry which can be used in the production of hemi-isotactic polypropylene as described in the U.S. Pat. No. 5,036,034 to Ewen. An example of a compound indicating a lack of bilateral symmetry is isopropylidene (3-methyl cyclopentadienyl-1 fluorenyl) zirconium dichloride having the ligand structure shown by the following formula:

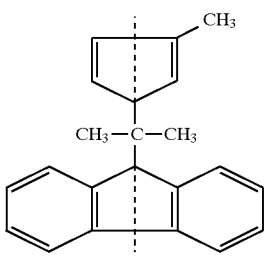

(10)

As explained in more detail in the aforementioned Ewen '034 patent, the lack of bilateral symmetry is indicated by the right side of the structure relative to the broken line being different from the left side because of the methyl group substituted at the distal position on the cyclopentadienyl group.

The various metallocene structures as described above can be used either as so-called "neutral metallocenes" in which case an alumoxane, such as methylalumoxane, is used as a co-catalyst, or they can be employed as so-called "cationic metallocenes" which incorporate a stable non-coordinating anion and normally do not require the use of an alumoxane. Syndiospecific cationic metallocenes are disclosed for example in U.S. Pat. No. 5,243,002 to Razavi. As disclosed there, the metallocene cation is characterized by the cationic metallocene ligand having sterically dissimilar ring structures which are joined to a positively-charged coordinating transition metal atom. The metallocene cation is associated with a stable non-coordinating counter-anion.

The aforementioned Razavi '002 patent also discloses the establishment of a stereorigid relationship imparted by a sterically-hindered relationship between substituted cyclopentadienyl rings which prevent rotation of the ring structures about their coordination axis. Alternatively, the cyclopentadienyl groups may be highly substituted such that a relatively low kinetic energy state is induced by the substituents in order to prevent rotation rings about their coordination axis at the temperature of the catalyst. Such cationic metallocenes also may, of course, like their neutral counterparts, be characterized by a stereorigid relationship imparted by means of a structural bridge between the cyclopentadienyl groups.

U.S. Pat. No. 5,225,500 to Elder et al discloses stereorigid cationic metallocenes, including, inter alia, bridged metallocene catalysts useful for the production of syndiotactic polymers. The bridged metallocene catalysts of U.S. Pat. No. 5,225,500 comprise an unbalanced metallocene cation and a stable, non-coordinating counteranion for the metallocene cation. The metallocene cation is characterized by a cationic metallocene ligand having sterically dissimilar ring structures joined to a positively charged coordinating transition metal atom. The dissimilar cyclopentadienyl rings, at least one of which is substituted, are both in a stereorigid relationship relative to the coordinating metallocene of the metal atom catalyst, and, as noted previously, the stereorigid relationship may be imparted by means of a structural bridge between the dissimilar cyclopentadienyl rings.

Catalysts employed in the polymerization of alpha-olefins may be characterized as supported catalysts or unsupported catalysts, sometimes referred to as homogeneous catalysts. Metallocene catalysts have traditionally been employed as unsupported or homogeneous catalysts, although, as described below, they also may be employed in supported catalyst components. Traditional supported catalysts are the socalled "conventional" Ziegler-Natta catalysts, such as titanium tetrachloride supported on an active magnesium dichloride as disclosed, for example, in U.S. Pat. Nos.

4,298,718 and 4,544,717, both to Myer et al. A supported catalyst component, as disclosed in the Myer '718 patent, includes titanium tetrachloride supported on an "active" anhydrous magnesium dihalide, such as magnesium dichloride or magnesium dibromide. The supported catalyst component in Myer '718 is employed in conjunction with a co-catalyst such as an alkylaluminum compound, for example, triethylaluminum (TEAl). The Myer '717 patent discloses a similar compound which may also incorporate an electron donor compound which may take the form of various amines, phosphenes, esters, aldehydes, and alcohols.

While metallocene catalysts are generally proposed for use as homogeneous catalysts, it is also known in the art to provide supported metallocene catalysts. As disclosed in U.S. Pat. Nos. 4,701,432 and 4,808,561, both to Welborn, a metallocene catalyst component may be employed in the form of a supported catalyst. As described in the Welborn '432 patent, the support may be any support such as talc, an inorganic oxide, or a resinous support material such as a polyolefin. Specific inorganic oxides include silica and alumina, used alone or in combination with other inorganic oxides such as magnesia, titania, zirconia and the like. Non-metallocene transition metal compounds, such as titanium tetrachloride, are also incorporated into the supported catalyst component. The Welborn '561 patent discloses a heterogeneous catalyst which is formed by the reaction of a metallocene and an alumoxane in combination with the support material. A catalyst system embodying both a homogeneous metallocene component and a heterogeneous component, which maybe a "conventional" supported Ziegler-Natta catalyst, e.g. a supported titanium tetrachloride, is disclosed in U.S. Pat. No. 5,242,876 to Shamshoum et al.

Various other catalyst systems involving supported metallocene catalysts are disclosed in U.S. Pat. Nos. 5,308,811 to Suga et al and 5,444,134 to Matsumoto. In both patents the supports are characterized as various high surface area inorganic oxides or clay-like materials. In the patent to Suga et al, the support materials are characterized- as clay minerals, ion-exchanged layered compounds, diatomaceous earth, silicates, or zeolites. As explained in Suga, the high surface area support materials should have volumes of pores having a radii of at least 20 angstroms. Specifically disclosed and preferred in Suga are clay and clay minerals such as montmorillonite. The catalyst components in Suga are prepared by mixing the support material, the metallocene, and an organoaluminum compound such as triethylaluminum, trimethylaluminum, various alkylaluminum chlorides, alkoxides, or hydrides or an alumoxane such as methylalumoxane, ethylalumoxane, or the like. The three components may be mixed together in any order, or they may be simultaneously contacted. The patent to Matsumoto similarly discloses a supported catalyst in which the support may be provided by inorganic oxide carriers such as $SiO_2$, $Al_2O_3$, $MgO$, $ZrO_2$, $TiO_2$, $Fe_2O_3$, $B_2O_2$, $CaO$, $ZnO$, $BaO$, $ThO_2$ and mixtures thereof, such as silica alumina, zeolite, ferrite, and glass fibers. Other carriers include $MgCl_2$, $Mg(OEt)_2$, and polymers such as polystyrene, polyethylene, polypropylene, substituted polystyrene and polyarylate, starches, and carbon. The carrier preferably has a surface area of 50–500 $m_2/g$ and a particle size of 20–100 microns.

SUMMARY OF THE INVENTION

In accordance with the present invention, there are provided supported stereospecific catalysts and processes for the stereotactic propagation of a polymer chain derived from ethylenically unsaturated monomers which contain three or more carbon atoms or which are substituted vinyl compounds, such as styrene and vinyl chloride. The preferred application of the present invention is in the stereospecific propagation of $C_3$–$C_4$ alpha olefins, particularly the polymerization of propylene to produce syndiotactic polypropylene. In carrying out the present invention, there is provided a supported metallocene catalyst comprising a stereospecific metallocene catalyst component and a co-catalyst component comprising at least one of an alkyl alumoxane and an alkylaluminum compound. The metallocene catalyst compound incorporates a metallocene ligand structure having two sterically dissimilar cyclopentadienyl ring structures coordinated with the central transition metal atom. At least one of the cyclopentadienyl ring structures is a substituted cyclopentadienyl group which provides an orientation with respect to said transition metal atom which is sterically different from the orientation of the other cyclopentadienyl group. Both of the cyclopentadienyl groups are in a relationship with one another by virtue of bridge or substituent groups, which provide a stereorigid relationship relative to the coordinating transition metal atom to prevent rotation of said ring structures. Both the metallocene catalyst component and the co-catalyst component are supported on a molecular sieve which has an average effective pore size which is less than the kinetic diameter of at least one of said ring structures. This supported catalyst is contacted in a polymerization reaction zone with an ethylenically unsaturated monomer which contains 3 or more carbon atoms or which is a substituted vinyl compound under polymerization conditions to produce syndiospecific polymerization of the monomer.

In a preferred embodiment of the invention, a supported catalyst incorporates a molecular sieve support having an average effective pore size within the range of 5–10 angstroms. In one application, the metallocene component preferably is an unbalanced metallocene having a ligand structure in which stereorigidity is imparted by means of a structural bridge extending between dissimilar cyclopentadienyl groups, for example, a fluorenyl group, a cyclopentadienyl group, of a ligand which exhibits bilateral symmetry. In this case, the preferred zeolitic structure is one having an average effective pore or "window" within the range of 5–10 angstroms. The specifically preferred zeolite support is selected from the group consisting of zeolite Y, zeolite X, mordenite, and zeolite β.

In yet a further aspect of the invention, the metallocene catalyst is an isospecific catalyst characterized by a chiralstereorigid metallocene ligand, such as a methylene, or disubstituted silyl, ethylene-bridged bis-indenyl or substituted indenyl ligands. Here, the zeolite molecular sieve support preferably is characterized by an average effective pore size within the range of 5–10 angstroms.

DETAILED DESCRIPTION OF THE INVENTION

The present invention involves processes for supported stereospecific metallocenes which may be neutral or cationic, and which are effective in stereospecific polymer propagation, especially syndiotactic polymer propagation, to provide an enhanced ordered polymer structure. As indicated previously, both conventional Ziegler-Natta catalysts and the metallocene-type catalysts can be supported on various inorganic supports. As indicated by the aforementioned patents to Myer, when supporting Ziegler-Natta-type catalysts, such as zirconium, hafnium, and titanium tetrahalides on crystalline materials, such as magnesium dichloride, it is thought to be highly desirable to "activate" the support material providing a large surface area on which the transition metal sites are exposed for the polymerization reaction in which the monomer units are incorporated into the growing polymer chain. Similar thing has dominated the use of supports for metallocene catalysts. Thus, high surface area materials are thought to be desirable and where microporous materials are employed, silica being the principal one of such material, relatively large pore spaces in relationship to the kinetic size of the metallocene ligand are thought to be desirable. Thus, as explained in the aforementioned patent to Suga et al, the pore volume of the support material should be provided by pores having a radii of at least 20 angstroms.

The present invention proceeds in a manner contrary to the conventional wisdom by employing supported metallocene catalysts in which the supports are provided by molecular sieves having an average effective pore size which is less than the kinetic diameter of at least one of the ring structures forming the metallocene ligand. More specifically, the support structure is provided by a zeolitic material having an average effective pore size or "window" within the range of about 5–10 angstroms, preferably within the range of about 5–8 angstroms. The term "zeolitic material," as used herein, is intended to include not only shape-selective zeolites as used in such reforming reactions as dewaxing, alkylation, transalkylation and the like, but also their highly silicious counterparts, such as silicalite, which have a very high silica/alumina ratio.

While applicant's invention is not to be limited by theory, it is postulated that the incorporation of the metallocene catalyst within the internal micropores of a support material, while advantageous in terms of catalyst activity in many instances, retards the crystallinity of the polymer structure by interfering with monomer insertion mechanisms. By way of example with respect to the use of metallocenes in the syndiotactic polymerization of propylene, an "unbalanced" metallocene structure catalyzes the formation of the growing polymer chain through an enantiomorphic site control mechanism. While the incorporation of the metallocene, and thus the transition metal polymerization sites, into the macropores of a support such as silica enhances the polymerization sites available, it also provides an environment in which entanglements of the growing polymer chain lead to a change in the rate of chain migration at the polymerization site. This, as shown by the experimental work reported below,, leads to a lower microtacticity than that which can be obtained by a conventional homogeneous metallocene-based catalyst.

The metallocenes employed in the present invention may be isospecific or syndiospecific, as described previously, but preferably are syndiospecific catalysts, and the invention will be described with regard to formation of syndiotactic polyolefins, specifically syndiotactic polypropylene. The term "metallocene," as used herein and in accordance with normal art usage, denotes an organometallic coordination compound in which two cyclo-$C_5$ ligands (cyclopentadienyl or substituted cyclopentadienyl rings) are bonded to a central or "sandwiched" metal atom which may be provided by a transition metal halide, alkyl, alkoxy, or alkoxy halide or the like. Such structures are sometimes referred to as "molecular sandwiches": since the cyclo-$C_5$ ligands are oriented above or below the plane of the central coordinated metal atom. The metallocene catalysts which are supported in accordance with the present invention may be neutral or they may be cationic. By the term "cationic metallocene" is meant a metallocene in which the central coordinated metal atom carries a positive charge, that is, the metallocene complex is a cation associated with a stable anion. The neutral or cationic metallocenes produced in accordance with the present invention are stereorigid. Preferably, stereorigidity is imported to the ligand structure by virtue of a chemical bridge extending between the cyclopentadienyl (or substituted cyclopentadienyl) rings.

As noted previously, parent U.S. Pat. No. 4,892,851 discloses the preparation of syndiotactic polypropylene or other polyolefins through the use of bridged stereorigid metallocene catalysts. U.S. Pat. No. 5,225,500 discloses stereorigid metallocene catalysts, including those in which stereorigidity is imparted by a bridge structure, in which a neutral metallocene is ionized to provide a stable cationic catalyst. Neutral metallocenes may also be converted to the cationic form following procedures of the type disclosed in the aforementioned U.S. Pat. Nos. 5,243,002 and 5,205,500 and also in European Patents 277,003 and 277,004 to Turner, but they preferably are prepared by a process employing a triphenylcarbenium borate as discussed in greater detail in application Ser. No. 419,046, filed Oct. 30, 1989 now abandoned. In the bridged metallocene catalysts prepared in accordance with the present invention, the cyclopentadienyl groups may be the same if they are to be used for isotactic polymer propagation, or different if they are to be used for syndiotactic polymer propagation.

As noted previously, a preferred application of the present invention is in the preparation of syndiospecific catalysts having a stereorigid bridge structure extending between dissimilar cyclopentadienyl rings. Such syndiospecific metallocenes may be characterized by the previously described formula (8):

$$R''(CpR_n)(CpR'_m)MeQ_k \qquad (8)$$

In formula (8), R and R' are selected such that $CpR'_m$ is a sterically different ring than $CpR_n$. Isospecific catalysts employed with the invention may also be characterized by formula (8) with the proviso that the two cyclopentadienyl groups, which may be substituted or unsubstituted, are chemically the same, that is, $C_pR'_m$ is the same as $C_pR_n$ and m and n may both vary from 0 to 4. Such isospecific catalysts are specifically characterized by the formula:

$$R''(CpR_n)_2MeQ_k \qquad (11)$$

The stereorigid metallocene catalysts prepared by the present invention may be neutral or cationic metallocenes. The cationic metallocenes correspond to the structures depicted by formulas (8) and (11) with the exception that k is an integer from 0 to 2, rather than the transition metal being possibly trisubstituted, as in the case of the neutral metallocenes. Such cationic metallocene catalysts may be characterized by the following formula:

$$[R''CpR_n)(CpR'_m)MeQ_k]^+P^- \qquad (12)$$

In formula (12), Cp, R, R', Me, m, and n are as described previously. K is a number from 0 to 2, and P is a stable noncoordinating counter anion. The cationic catalysts of formula (12) may be prepared from the corresponding neutral metallocenes using procedures as described below.

The counter anion indicated by P in formula (12) is a compatible noncoordinating anion which may be of the type described in the aforementioned Elder et al, Razavi U.S. patents or the Turner European patents. The anion P either does not coordinate with the metallocene cation or is only weakly coordinated to the cation, thereby remaining sufficiently liable to be displaced by a neutral Lewis base. As described in the Turner patents, the term "compatible noncoordinating anion" identifies an anion which, when functioning as a stabilizing anion in the metallocene catalyst system, does not transfer an anionic substituent or fragment thereof to the cation to form a neutral metallocene and boron byproduct or other neutral metal or metalloid byproduct, as the case may be. Suitable noncoordinating anions include: $[W(PhF_5)]^-$, $[Mo(PhF_5)^-]$ (wherein $PhF_5$ ispentafluorylphenyl), $[ClO_4]^-$, $[SbR_6]^-$, and $[AlR_4]^-$ (wherein each R is independently, Cl, a $C_1$–$C_5$ alkyl group, preferably, a methyl group, an aryl group, e.g., a phenyl or substituted phenyl group, or a fluorinated aryl group. For a further description of compatible noncoordinating anions and their associated cations which may be employed in the present invention, reference is made to U.S. Pat. Nos. 5,225,500 and 5,243,002 and EPO Patent Nos. 277,003 and 277,004, the entire disclosures of which are incorporated herein by reference.

The bridged metallocene catalysts produced by the procedures of the present invention may be isospecific or syndiospecific, as discussed previously. The bridge configuration of the R" structural bridge is controlled by the terminal carbon substituents of the substituted fulvene. For example, where the fulvene reactant is 6,6 dimethyl fulvene, as is preferred, the structural bridge will be a $C_3$ alkylene group, commonly referred to as propylidene. The use of 6,6 methyl, ethyl fulvene will result in a $C_4$ structural bridge, and the use of 6,6 diethyl fulvene as a reactant will result in a $C_5$ structural bridge. The bridge is preferably selected from the group consisting of alkyl radicals having 3–6 carbon atoms, more preferably, 3–5 carbon atoms. Examples of alkyl bridges include propyl, butyl, and pentyl bridges which may be substituted or unsubstituted. Me in formula (12), preferably, is a Group 4 or 5 metal, and more preferably, a Group 4 metal, specifically titanium, zirconium, or hafnium. Vanadium is the most suitable of the Group 5 metals. Q will usually be a methyl or ethyl group or chlorine.

Where the present invention is employed in the production of syndiotactic polymers, the cyclopentadienyl and substituted fulvene reactants are preferably chosen so that the resulting syndiospecific catalysts exhibit bilateral symmetry of the metallocene ligands when viewed as planar projections of the cyclopentadienyl groups. By the term "bilateral symmetry," as used here, it is meant the symmetry of the ligand as viewed through the axes of the substituted or unsubstituted Cp groups, as shown above by formula (9). For example, the reaction of fluorene with 6,6dimethyl fulvene produces the isopropylidene (cyclopentadienyl-1-fluorenyl) ligand which exhibits such bilateral symmetry. However, the similar reaction carried out with a ring substituted fulvene, such as 3-alkyl, 6,6-dimethyl fulvene, would result in a corresponding structure, but with the cyclopentadienyl group substituted at the three position, would not exhibit bilateral symmetry as shown above by formula (10). The ligand with two identical substituents at the 3 and 4 positions on the cyclopentadienyl group would have bilateral symmetry.

Usually, in the metallocenes employed in the present invention, Me is titanium, zirconium, hafnium, or vanadium; Q is, preferably, a methyl or halogen, more preferably chorine; and k, preferably, is 2 for neutral metallocenes, and 1 for cationic metallocenes, but may vary with the valence of the metal atom. Exemplary hydrocarbyl radicals include methyl, ethyl, propyl, isopropyl, butyl, isobutyl, amyl, isoamyl, hexyl, heptyl, octyl, nonyl, decyl, cetyl, phenyl, and the like. Other hydrocarbyl radicals include other alkyl, aryl, alkenyl, alkylaryl, or arylalkyl radicals. Further, Rn and R'm may comprise hydrocarbyl radicals attached to a single carbon atom in the Cp ring, as well as radicals that are bonded to two carbon atoms in the ring as in the case of a fluorenyl. Neural metallocenes prepared in accordance with procedures of the present invention may be converted to the cationic state following procedures such as disclosed in the aforementioned U.S. Pat. Nos. 5,225,500 and 5,243,002 and European Patent Nos. 277,003 and 277,004, or more preferably, by reaction with triphenylcarbenium boronates, as described in the aforementioned U.S. application Ser. No. 419,046 filed on Oct. 30, 1989, now abandoned. Exemplary neutral syndiospecific metallocenes which may be employed in the present invention are isobutylidene(cyclopentadienyl-1-fluorenyl), zirconiumdimethyl, isopentylidene (cyclopentadienyl-1-fluorenyl)zirconium dimethyl, isopropylidene(indenyl)(cyclopentadienyl)zirconium dimethyl, isopropylidene(cyclopentadienyl-1-fluorenyl) zirconium dimethyl, diphenyl methylene(cyclopentadienyl-1-fluorenyl)zirconium dimethyl, and the corresponding dichlorides or methylchlorides.

Examples of isospecific neutral metallocenes which can be employed in accordance with the present invention include isopropylidene bis-(2,3 dimethylcyclopentadienyl) zirconium dimethyl, isopropylidene bis (tetramethylcyclopentadienyl) zirconium dimethyl, and isopropylidene bis (2,4 dimethylcyclopentadienyl) zirconium dimethyl, ethylene bis-(indenyl)zirconium dimethyl and the corresponding dichlorides. Further neutral metallocenes include ethylene bis(2-methyl indenyl) zirconium dichloride, dimethyl silyl bis(2-methyl indenyl) zirconium dichloride, diphenyl silyl bis(2-methyl indenyl) zirconium dichloride, diphenyl silyl bis(2-methyl, 4-phenyl-indenyl) zirconium dichloride, and diethyl silyl bis(2-methyl, 4-phenyl indenyl) zirconium dichloride. Other corresponding metallocenes, especially the corresponding hafnium and titanium metallocenes, can also be employed in accordance with the present invention to produce syndiospecific or isospecific catalysts. Similarly, other metallocene dialkyls, for example, such as the zirconium or hafnium diethyls and other dihalides, may also be made following the present invention, but, as a practical matter, the neutral metallocenes will be in the form of dimethyl or dichloride compounds, and the cationic metallocenes will usually be in the form of the chlorides.

The metallocene catalysts are supported on molecular sieve zeolites in order to take advantage of the topology of the zeolitic support in a manner which can be characterized as a "reverse" application of the principal of shape selectivity. In catalysis with molecular sieve zeolites (the term "zeolite" is used herein to embrace silica polymorph molecular sieve analogues of zeolites, such as the silica polymorph silicalite, which is topologically analogous to the zeolite ZSM-5), the zeolite framework is used to selectively pass certain molecular species while excluding others. With few exceptions, zeolites have three-dimensional structures which provide internal cavities with channels interconnecting the cavities and the interior of the zeolite structure with the exterior of the zeolite crystalline structure. Such zeolites can be characterized in teems of surface area and pore volume per unit of volume or weight and, in terms of the effective pore size, sometimes referred to as the "window" size. The channel-type configuration of such shaped selective zeolites is employed to promote certain chemical reactions while retarding others. An example is in the use of the molecular sieve silicalite to arrive at ortho-suppressed alkylbenzene, such as disclosed in U.S. Pat. No. 4,489,214 to Butler et al. Thus, in the methylation or ethylation or toluene, the ortho isomer is suppressed while production of the para-isomer is enhanced. This function can be characterized in terms of a simplistic model in which the molecular sieve "window" of a configuration to allow a para-isomer, such as para-xylene, to pass through the zeolite channels while restricting passage of the ortho-isomer which can be characterized in terms of a somewhat larger or "bulkier" kinetic diameter, than the para-isomer, when aligned within the molecular sieve channels.

The present invention employs zeolitic molecular sieves in what can be characterized as a "reverse application" of the principle of shape selectivity when employed in chemical processing reactions, such as alkylation, transalkylation, and the like. Here, the zeolitic molecular sieves are used as supports in a manner to preclude the polymerization reaction from occurring within the molecular sieve framework. As described below, zeolitic molecular sieves, which can be employed in carrying out the invention, can be selected from a wide range of zeolites depending upon the particular type of metallocene and polymer structure involved. This is indicated by the following experimental work. Zeolite Y which has an effective pore size or "window" of about 7 angstroms and is highly effective in providing a syndiospecific-enhancing support structure for the metallocene diphenylmethylene(cyclopentadienyl fluorenyl) zirconium dichloride employed in conjunction with methylaluminoxane and tributylaluminum co-catalyst. The ligand structure of this metallocene has an effective kinetic diameter of 10–15 angstroms and, thus, inclusion within the molecular sieve framework is severely retarded, if not eliminated entirely. However, this same zeolite Y structure would be a substantially less effective support for a metallocene such as bis-cyclopentadienyl titanium dichloride or even its bridged analog, isopropylidene bis-cyclopentadienyl zirconium dichloride. Zeolite Y would also provide a relatively good support for rac-ethylene bis-(indenyl) hafnium dichloride, which is a well-known isospecific catalyst. However, a molecular sieve, such an a ZSM-5 or its silica polymorph analog, silicalite, would be expected to be an even better support for this isospecific catalyst, as well as being a good support for syndiospecific metallocenes.

Other zeolites which can be used in carrying out the invention include mordenite, which can be characterized as "small port" (having an effective window size of about 5–6 angstroms or "large port" (having an effective window size of about 7–10 angstroms) and ZSM-11, which is similar topologically to ZSM-5. Where ZSM-5 has somewhat elliptical apertures or channels having an effective pore size of about 5.5 angstroms, ZSM-11 has nearly circular apertures, again having an effective pore size of about 5.5 angstroms. Other zeolites which can be employed as support materials include zeolite X, zeolite Y, zeolite β, zeolite Ω, and various zeolites of the ZSM substitutional series, including, in addition to ZSM-5 and ZSM-1 1, ZSM-12.

The pore size of a given zeolite can vary depending on various factors. For example, for a given zeolite, such as mordenite or zeolite Y, the acid or hydrogen form of the zeolite can be expected to have a larger aperture than the same zeolite exchanged with sodium. The potassium form of the zeolite will exhibit yet a smaller pore size. For example, the hydrogen form of zeolite Y can be expected to have a pore size of 7.5–10 angstroms, the sodium form, 7–8 angstroms, and the potassium form, 6.5–7.5 angstroms. The pore size of a zeolite can also be varied by exchange with an alkaline earth metal ion such as calcium and barium ions, although not always predictably. For example, the calcium or barium forms of mordenite show a reduced effective window size, whereas the exchange of zeolite X with calcium or barium increases the effective pore size. Similarly, synthetic faujasites and the topologically similar faujasites have been identified as having a pore volume of 10 angstroms for the calcium exchanged forms and about 13 angstroms for the sodium exchanged forms. Also, modifications of zeolites to include alkoxy groups, such as methoxy groups, can substantially reduce the pore size of the zeolite channel system. Other polar groups similarly can be used to reduce the effective pore size of a zeolite support. The crystallographic symmetry of a given zeolite can also be changed with a resultant change in the effective pore size.

Zeolites, other than the traditional alumino-silicate zeolites, or their highly silicaceous counterparts, such as silicalite, can also be employed as support materials for the present invention. For example, Union Carbide molecular sieve zeolites based upon aluminum-phosphorous rather than aluminum silicon framework structures are available under the designation $AlPO_4$. These molecular sieves, such as $AlPO_{4, -5, -11, and -35}$, have pore sizes within the range of about 6–8 angstroms and are suitable as supports for various syndiospecific catalysts as described above.

The molecular sieves, used as supports in the present invention, can be used in their crystalline form or in a form in which they are extruded with a binder such as alumina. Preferably, the molecular sieve support material will have a surface area of at least 400 $m^2/g$ and more preferably at least 450 $m^2/g$. The effective surface area will be normally reduced somewhat if the zeolite is employed in an extruded form with a binder such as alumina. For example, a zeolitic molecular sieve having a surface area of about 500 $m^2/g$ in crystalline form can be expected to have an effective surface area of about 420 $m^2/g$ when employed with a binder such as gamma alumina in an amount of about 20 wt. %.

As noted previously, molecular sieves based upon alumina-phosphate rather than alumina-silicate zeolites can be employed in the present invention. Similarly, artificial zeolites synthesized with Group IIIA atoms, other than aluminum, can be employed. For example, zeolites analogous to zeolite β can be synthesized as boro-silicates, gallo-silicates, or boro-aluminum or gallo-aluminum silicates having window apertures slightly smaller or slightly larger than the corresponding aluminosilicate zeolite β.

The pore size or window apertures or zeolite structures and procedures for modifying such structures are well known to those skilled in the art. For a further description of molecular sieves of appropriate pore size for use in the present invention, reference can be made to Van Zandt, E. F., *Pore Size Engineering and Zeolites,* John Wiley and Sons, 1990.

The supported metallocenes used in the present invention can be prepared by any suitable technique. Procedures known in the prior art for preparing supported metallocene catalysts can be used in preparing the supported metallocenes of the present invention with the exception, of course, that the support takes the form of a molecular sieve having the pore size characteristics called for in the present invention. Thus, procedures such as those disclosed in the aforementioned U.S. Pat. No. 5,308,811 to Suga et al and U.S. Pat. No. 5,444,134 to Matsumoto et al may be employed in forming the supported catalysts of the present invention with the exception of the surface area and pore size criteria specified in these references. In employing the procedures of this nature, the catalyst components, i.e., the organo aluminum compound, and the molecular sieve support can be mixed together in any order or contacted simultaneously as disclosed, for example, in the Suga et al and Matsumoto references. For a further description of such procedures, reference is made to U.S. Pat. Nos. 5,308,811 to Suga et al and 5,444,134 to Matsumoto et al, the entire disclosures which are incorporated herein by reference.

Preferably where a so-called neutral metallocene is employed it is desirable to first treat the support with an alkylalumoxane co-catalyst such as methylalumoxane (MAO) with subsequent contact of alumoxane treated support with the metallocene. Subsequent to contact of the molecular support with the alumoxane and metallocene, a co-catalyst such as trimethylaluminum, triethylaluminum or tri-isobutylaluminum (TIBAL) can be added supported catalyst and the catalyst then used in the polymerization reaction.

In a preferred embodiment of the present invention, the zeolite support is first subjected to a dealumination step. This is provided by an acid etching step in which the zeolite support is treated with an inorganic acid. Preferably, a strong mineral acid such as sulfuric acid, hydrochloric acid, or nitric acid is employed with the latter being especially preferred.

While applicants' invention is not to be limited by theory, it appears that the initial acid etching step results in removal of some aluminum atoms from the silica-alumina structure of the zeolite framework. Subsequent treatment of the zeolite structure with the alumoxane results in the added aluminum atoms "binding" back into the crystalline structure of the zeolite thus incorporating the alumoxane into the zeolite structure. As described in greater detail below the acid treatment procedure is carried out over a relatively short period of time, limiting the acid etching in large measure to the surface portion of the zeolite particles and avoiding restructuring of the zeolite to accommodate redistribution of the aluminum atoms in the structure, over time to satisfy an equilibrium mechanism within the molecular sieve structures.

Preferably, in carrying out the present invention, the acid etching process involves removal of about 10–20 weight percent of the aluminum originally present in the molecular sieve makeup. The etching procedure is carried out over a relatively short period of time and under temperature and pH conditions to concentrate the aluminization procedure on the surface of the molecular sieve particles. Preferably, the pH of the aqueous acid solution is within the range of about 0.1–4.5. The treatment should be limited, as a practical matter, so that no more than 30% of the total aluminum in the zeolite is removed. As noted previously, preferably the a dealuminization is limited to about 20% or less of the total aluminum in the molecular sieve framework. By limiting the acid treatment time, migration of the defects to the interior portion of the molecular sieve particles via the quilibration mechanism is minimized. As a practical matter the zeolite should be treated shortly after the acid-etching step, although once the etching process is completed, the defects in the molecular sieve framework are relatively stable.

As stated earlier, the preferred mineral acid for use in the dealuminization procedure in accordance with the present invention is nitric acid. Preferably the etching time employing the nitric acid, or other mineral acid is within the range of about 10–30 minutes and the temperature is within a range of about 80°–90° C. The aqueous acid solutions having a pH toward the upper end of the range, near a pH of about 4.5, tend to require a longer etching time than those aqueous acid solutions which are near the lower end of the range, i.e., a pH near 0.1.

As noted previously the dealumination of the zeolite framework effected by the acid treating step is concentrated in the outer shell area of the zeolite particles with little or no dealumination occurring with the inner or core area of the zeolite particles. This ordering of the framework aluminum ions in the molecular sieve crystalline structure can be depicted by the following diagrams. In considering the diagrams below, it will be recognized that they are merely schematic representations of the aluminum within the zeolite framework.

The broken line in Diagram I indicates the aluminum concentration as depicted by the silica/alumina ratio on the ordinate versus the distance from the center of the catalyst particle on the abscissa. As indicated, the aluminum content is constant throughout the zeolite framework, and thus, the aluminum gradiant, observed from the core area of the particle to the outer shell, from left to right in Diagram I, is constant.

At the conclusion of the alumination step, some of the framework aluminum is removed from the zeolite structure as described above. This disordering of the zeolite structure is primarily manifested in the outer shell area of the zeolite particle, resulting in a negative aluminum gradient from the core area to the outer shell of the zeolite particle as depicted in Diagram II.

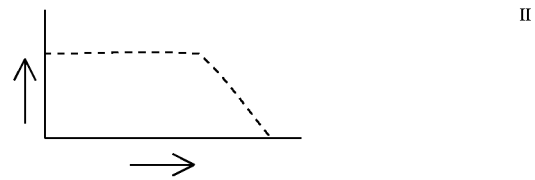

The benefits accruing to the acid etching step are believed to be due to this outer shell dealumination. When the catalyst particles are subsequently treated with the alumoxane solution, defects in the molecular sieve framework due to the dealumination provide sites for the alumoxane particles to be incorporated into the zeolite structure. This can be depicted by Diagram III, which shows an aluminum gradient in the catalyst particle due to the alumoxane. As can be shown, the aluminum tied up in the alumoxane provides a positive aluminum gradient in the direction from the interior of the catalyst particle to the outer surface of the catalyst particle.

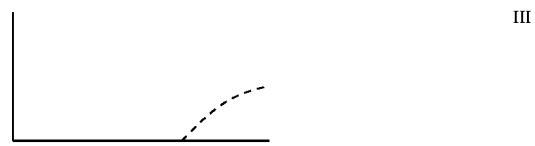

In experimental work carried out respecting the present invention, a syndiospecific metallocene catalyst, diphenylmethylene(cyclopentadienyl fluorenyl)zirconium dichloride, was used in the polymerization of propylene as a homogeneous catalyst and as a supported catalyst on various supports. In each case, methylalumoxane (MAO) was used as the co-catalyst component ionizing agent, and for the supported catalysts, TIBAL was used as a co-catalyst scavenging agent.

Three supports were used in the experimental work, zeolite Y, hydrogen form, having an effective pore size of 7–8 angstroms, zeolite Phi, hydrogen form, having an effective pore size of 3–5 angstroms, and amorphous silica having an effective pore size of about 100–200 angstroms. In each case the TIBAL was used as a co-catalyst in a weight ratio to the metallocene catalyst of 3:1.

In each case the supported catalysts were prepared by first acid etching the zeolite support with an inorganic mineral acid, in this case nitric acid, followed by MAO treatment with the metallocene being added after treatment of the acid etched support with methylalumoxane. The acid etching procedure involved preparing a slurry of 10 g. of the zeolite in 100 ml. of water. The slurry was placed in a hot oil bath to bring the slurry temperature to 80° C. after which 15 g. of fuming nitric acid was added to the slurry. The slurry temperature was maintained at 80° C. and mixed for one-half hour.

The solids were then recovered from the slurry by filtering and washed three times with water at 80° C. The acid etched zeolite particles were air dried for one hour and dried in a vacuum at 240° C. overnight.

A solution of methylalumoxane and toluene was then added to the solid zeolite particles and stirred in refluxed toluene for four hours at 116° C. The ratio of MAO to zeolite was 1.4:1. The MAO treated solid was then recovered by filtering, washed three times with toluene, and dried at room temperature overnight. The diphenylmethylene (cyclopentadienyl fluorenyl)zirconium dichloride was then added in an amount of 2 wt. % and stirred at room temperature for about one hour. The solid product was then filtered and washed in water at room temperature.

Catalysts thus prepared using the two zeolites identified above and silica as supports were used in three polymerization runs. In each case the supported catalyst component was used in an amount of 36 mg., the TIBAL was added in an amount of 108 mg. to provide the 3:1 ratio noted above. A fourth test was carried out using the diphenylmethylene (cyclopentadienyl fluorenyl)zirconium dichloride as a homogenuous catalyst without a support. In this case, a trialkylaluminum was not used, and methylalumoxane was employed as a co-catalyst. The homogenuous catalyst was used in an amount of 0.2 mg. in conjunction with 1 mg. of MAO. Sixteen millimoles of hydrogen was used in each of the polymerization runs.

The silica supported catalyst and the homogeneous catalyst, as expected, showed relatively high yields of 300 grams and 200 grams, respectively. The syndiotacticity of the resulting polymer is measured by the racemic pentad (rrrr) was 83% for the homogeneous catalyst and 77.5% for the silica-supported catalyst. For the two zeolite supported catalysts, the yields were lower, 35 g. for the zeolite Phi supported, 86 g. for the zeolite Y supported catalyst, and 30 g. for H-Y. But, surprisingly, the crystallinity of the polymer product was near to or equal to the crystallinity of the polymer produced by the homogenous catalyst. Thus, the Phi zeolite supported catalyst produced syndiotactic polypropylene having 82.1% racemic pentads whereas the Y supported catalyst produced polypropylene having 83.2% racemic pentads.

Having described specific embodiments of the present invention, it will be understood that modifications thereof may be suggested to those skilled in the art, and it is intended to cover all such modifications as fall within the scope of the appended claims.

What is claimed:

1. A supported metallocene catalyst comprising:
   a) a particulate catalyst support comprising a molecular sieve zeolite in the hydrogen form selected from the group consisting of zeolite Y, zeolite X, morderite, and zeolite beta, having an average effective pore size of no more than 10 angstroms;
   b) a stereospecific metallocene supported on said particulate support and incorporating a metallocene ligand structure having two sterically dissimilar cyclopentadienyl ring structures coordinated with a central transition metal atom; at least one of said cyclopentadienyl ring structures being a substituted cyclopentadienyl group which provides an orientation with respect to said transition metal atom which is sterically different from the orientation of the other cyclopentadienyl group with respect to said transition metal atom, both of said cyclopentadienyl groups being in a relationship with each other providing a stereorigid relationship relative to said coordinating transition metal atom to prevent rotation of said ring structures; and
   c) said metallocene ligand structure having a kinetic diameter which is greater than the average effective pore size of said molecular sieve and being preferentially carried on the outer shell portion of said molecular sieve.

2. The composition of claim 1 wherein said molecular sieve support has a surface area of at least 400 m²/g.

3. The composition of claim 1 wherein said molecular support sieve has an average effective pore size with the range of 5–10 angstroms.

4. The composition of claim 1 wherein said supported catalyst further comprises an aluminum-containing co-catalyst incorporated into said support in a manner to provide a positive concentration gradient of said co-catalyst extending outwardly from the interior to the outer shell of said particulate support.

5. The composition of claim 1 wherein said stereospecific metallocene is characterized by the formula:

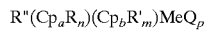

$$R''(Cp_aR_n)(Cp_bR'_m)MeQ_p$$

wherein $Cp_a$ is a substituted cyclopentadienyl ring, $Cp_b$ is an unsubstituted or substituted cyclopentadienyl ring; each R is the same or different and is a hydrocarbyl radical having 1–20 carbon atoms; each $R'_m$ is the same or different and is a hydrocarbyl radical having 1–20 carbon atoms; R'' is a structural bridge between the cyclopentadienyl rings imparting stereorigidity to the catalyst and is selected from the group consisting of an alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b, or 6b metal from the Periodic Table of Elements; each Q is a hydrocarbyl radical having 1–20 carbon atoms or is a halogen; $0 \leq p \leq 3$; $0 \leq m \leq 4$; $1 \leq n \leq 4$; and wherein $R'_m$ is selected such that $(Cp_bR'_m)$ is a sterically different ring than $(Cp_aR_n)$.

6. The composition of claim 5 wherein R is selected such that $(Cp_aR_n)$ forms a substituted or unsubstituted fluorenyl group.

7. The composition of claim 6 wherein Me is titanium, zirconium, hafnium, or vanadium and R'' is a methylene, ethylene, organosilyl, substituted methylene, or substituted ethylene radical.

8. The composition of claim 7 wherein $R''(CpR_n)(CpR'_m)$ forms an isopropylidene(cyclopentadienyl-1-fluorenyl) radical or a diphenylmethylene(cyclopentadienyl-1-fluorenyl) radical.

9. The composition of claim 1 wherein said molecular sieve support has an average effective pore size within the range of 5–8 angstroms.

10. In a process for the production of a supported metallocene catalyst, the steps comprising:
    a) providing a particulate catalyst support comprising zeolite molecular sieve particles;
    b) subjecting said zeolite molecular sieve particles to a dealumination procedure in order to remove framework aluminum atoms preferentially from the outer shell portion of said molecular sieve particulates;
    c) contacting said delaminated molecular sieve particles with an alumoxane co-catalyst;
    d) thereafter contacting the molecular sieve resulting from step (c) with a stereospecific metallocene incorporating a metallocene ligand structure having two sterically dissimilar cyclopentadienyl ring structure coordinated with a central transition metal ion and being in a stereorigid relationship relative to said coordinating transition metal ion to prevent rotation of said ring structures.

11. The process of claim 10 wherein said dealumination procedure comprises an acid etching step comprising contacting said molecular sieve particles with an aqueous acid solution having a Ph within the range of about 0.1–4.5.

12. The process of claim 11 wherein said acid etching step is carried for a time period of about 30 minutes or less.

13. The process of claim 11 wherein said aqueous acid solution is nitric acid and said etching step is carried out for a time period within the range of about 10–30 minutes at a temperature of about 80°–90° C.

14. A supported metallocene catalyst comprising:
    a) a particulate catalyst support comprising an alumino silicate zeolite molecular sieve having a negative aluminum gradient from the core area to the outer shell area of said zeolite support;
    b) a stereospecific metallocene supported on said particulate support and incorporating a metallocene ligand structure having two sterically dissimilar cyclopentadienyl ring structures coordinated with a central transition metal atom; at least one of said cyclopentadienyl ring structures being a substituted cyclopentadienyl group which provides an orientation with respect to said transition metal atom which is stoically different from the orientation of the other cyclopentadienyl group with respect to said transition metal atom, both of said cyclopentadienyl groups being in a relationship with each other providing a stereorigid relationship relative to said coordinating transition metal atom to prevent rotation of said ring structures; and
    c) said metallocene ligand structure having a kinetic diameter which is greater than the average effective pore size of said molecular sieve and being preferentially carried on the outer shell portion of said molecular sieve.

15. The composition of claim 14 wherein said molecular sieve support has a surface area of at least 400 m²/g.

16. The composition of claim 14 wherein said stereospecific metallocene is characterized by the formula:

$$R''(Cp_aR_n)(Cp_bR'_m)MeQ_p$$

wherein $Cp_a$ is a substituted cyclopentadienyl ring, $Cp_b$ is an unsubstituted or substituted cyclopentadienyl ring; each R is the same or different and is a hydrocarbyl radical having 1–20 carbon atoms; each $R'_m$ is the same or different and is a hydrocarbyl radical having 1–20 carbon atoms; $R''$ is a structural bridge between the cyclopentadienyl rings imparting stereorigidity to the catalyst and is selected from the group consisting of an alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b, or 6b metal from the Periodic Table of Elements; each Q is a hydrocarbyl radical having 1–20 carbon atoms or is a halogen; $0 \leq p \leq 3$; $0 \leq m \leq 4$; $1 \leq n \leq 4$; and wherein $R'_m$ is selected such that $(Cp_bR'_m)$ is a stoically different ring than $(Cp_aR_n)$.

17. The composition of claim 16 wherein R is selected such that $(C_{pa}R_n)$ forms a substituted or unsubstituted fluorenyl group.

18. The composition of claim 17 wherein Me is titanium, zirconium, hafnium, or vanadium and R'' is a methylene, ethylene, organosilyl, substituted methylene, or substituted ethylene radical.

19. The composition of claim 18 wherein $R''(CpR_n)(CpR'_m)$ forms an isopropylidene(cyclopentadienyl-1-fluorenyl) radical or a diphenylmethylene(cyclopentadienyl-1-fluorenyl) radical.

20. The composition of claim 14 wherein said supported catalyst further comprises an aluminum-containing co-catalyst incorporated into said support material in a manner to provide a positive concentration gradient of said co-catalyst extending outwardly from the interior to the outer shell of said particulate support.

* * * * *